US011718472B2

(12) United States Patent
Cheng et al.

(10) Patent No.: US 11,718,472 B2
(45) Date of Patent: Aug. 8, 2023

(54) AUTOMATED GUIDED VEHICLE DESIGNED FOR WAREHOUSE

(71) Applicant: HAI ROBOTICS CO., LTD., Shenzhen (CN)

(72) Inventors: Jui-chun Cheng, Shenzhen (CN); Shengdong Xu, Shenzhen (CN); Yuqi Chen, Shenzhen (CN)

(73) Assignee: HAI ROBOTICS CO., LTD., Shenzhen (CN)

(*) Notice: Subject to any disclaimer, the term of this patent is extended or adjusted under 35 U.S.C. 154(b) by 0 days.

(21) Appl. No.: 16/476,126

(22) PCT Filed: Sep. 7, 2018

(86) PCT No.: PCT/CN2018/104652
§ 371 (c)(1),
(2) Date: Jul. 5, 2019

(87) PCT Pub. No.: WO2019/095803
PCT Pub. Date: May 23, 2019

(65) Prior Publication Data
US 2019/0352092 A1    Nov. 21, 2019

(30) Foreign Application Priority Data

Nov. 14, 2017  (CN) .......................... 201711135812.7
Nov. 14, 2017  (CN) .......................... 201711141498.3

(51) Int. Cl.
*B65G 1/04*      (2006.01)
*B65G 1/137*     (2006.01)
(Continued)

(52) U.S. Cl.
CPC ......... *B65G 1/0435* (2013.01); *B65G 1/1373* (2013.01); *B65G 1/1375* (2013.01);
(Continued)

(58) Field of Classification Search
CPC .. B65G 1/0435; B65G 1/1373; B65G 1/1375; B65G 2203/0216; B65G 2203/041;
(Continued)

(56) References Cited

U.S. PATENT DOCUMENTS 3,549,025 A * 12/1970 Messner ................. B66F 9/141
                                                       414/282
3,556,329 A *  1/1971 Johnston ................ B66F 9/141
                                                       414/663
(Continued)

FOREIGN PATENT DOCUMENTS

CA      2144886 A1 *  9/1996  ............. B66F 9/075
CH      680212 A5      7/1992
(Continued)

*Primary Examiner* — James Keenan

(57) ABSTRACT

An Automated Guided Robot (AGV) system designed for carrying, storing and retrieving inventory items to and from storage shelves. The AGV (100) can move between warehouse shelves and reach to the inside of a shelf without turning. The AGV (100) is equipped with a material handling device (130). The material handling device (130) comprises a lateral device that is configured to move in a lateral direction either to the right side or to the left side. The movement of the lateral device can be either rotational or translational. The material handling device (130) further comprises a retractable device that retracts or extends in a direction perpendicular to the lateral direction. The retractable device allows the material handling device (130) to extend into the storage shelf to fetch or place an inventory item.

27 Claims, 12 Drawing Sheets

(51) Int. Cl.

| | |
|---|---|
| *B66F 9/06* | (2006.01) |
| *G06Q 10/08* | (2023.01) |
| *B66F 9/075* | (2006.01) |
| *B66F 9/14* | (2006.01) |
| *B66F 9/12* | (2006.01) |
| *B25J 5/00* | (2006.01) |
| *B25J 9/00* | (2006.01) |
| *B25J 9/10* | (2006.01) |
| *B25J 9/16* | (2006.01) |
| *B25J 15/00* | (2006.01) |
| *G06T 7/70* | (2017.01) |

(52) U.S. Cl.
CPC ............ *B66F 9/063* (2013.01); *B66F 9/075* (2013.01); *B66F 9/122* (2013.01); *B66F 9/141* (2013.01); *G06Q 10/08* (2013.01); *B25J 5/007* (2013.01); *B25J 9/0009* (2013.01); *B25J 9/104* (2013.01); *B25J 9/1638* (2013.01); *B25J 9/1679* (2013.01); *B25J 15/0014* (2013.01); *B65G 1/0492* (2013.01); *B65G 1/137* (2013.01); *B65G 2203/0216* (2013.01); *B65G 2203/041* (2013.01); *G06T 7/70* (2017.01)

(58) Field of Classification Search
CPC .......... B66F 9/063; B66F 9/122; B66F 9/075; B66F 9/0755; B66F 9/141; G06Q 10/08
See application file for complete search history.

(56) References Cited

U.S. PATENT DOCUMENTS

| | | | | |
|---|---|---|---|---|
| 3,727,778 | A * | 4/1973 | Hollenbach | B66F 9/14 |
| | | | | 414/541 |
| 4,458,808 | A * | 7/1984 | Loomer | B66F 9/141 |
| | | | | 198/750.1 |
| 4,492,504 | A * | 1/1985 | Hainsworth | B66F 9/07 |
| | | | | 414/273 |
| 4,678,390 | A * | 7/1987 | Bonneton | B65G 1/1375 |
| | | | | 294/4 |
| 4,941,794 | A * | 7/1990 | Hara | B65G 67/20 |
| | | | | 104/37 |
| 5,104,277 | A * | 4/1992 | Bullock | G01R 31/2808 |
| | | | | 414/280 |
| 5,211,523 | A * | 5/1993 | Andrada Galan | B65G 1/1371 |
| | | | | 414/282 |
| 7,320,385 | B2 | 1/2008 | Katae et al. | |
| 7,344,037 | B1 * | 3/2008 | Zakula, Sr. | B66C 13/46 |
| | | | | 212/270 |
| 9,701,471 | B2 | 7/2017 | Yamada | |
| 10,071,856 | B2 * | 9/2018 | Hance | B65G 1/1373 |
| 10,343,881 | B2 * | 7/2019 | Guo | B65G 1/137 |
| 10,613,533 | B1 * | 4/2020 | Payson | G06Q 10/087 |
| 10,683,171 | B2 * | 6/2020 | Jarvis | B65G 1/0492 |
| 10,769,582 | B2 * | 9/2020 | Williams | G06Q 10/08 |
| 10,803,420 | B2 * | 10/2020 | Jarvis | G05D 1/0297 |
| 10,815,055 | B2 * | 10/2020 | Overfield | B66F 9/141 |
| 10,894,663 | B2 * | 1/2021 | Kapust | B65G 1/0435 |
| 10,957,569 | B2 * | 3/2021 | Tawyer | B65G 1/0457 |
| 10,962,963 | B2 * | 3/2021 | Zanger | B66F 9/063 |
| 11,427,405 | B1 | 8/2022 | Theobald et al. | |
| 2003/0185656 | A1 | 10/2003 | Hansl et al. | |
| 2004/0047714 | A1 | 3/2004 | Poli et al. | |
| 2006/0245862 | A1 | 11/2006 | Hansl et al. | |
| 2006/0248562 | A1 | 11/2006 | Kitsukawa | |
| 2008/0044262 | A1 | 2/2008 | Kim et al. | |
| 2009/0162176 | A1 | 6/2009 | Link et al. | |
| 2013/0096713 | A1 | 4/2013 | Takizawa et al. | |
| 2013/0209203 | A1 | 8/2013 | Rafols | |
| 2015/0032568 | A1 | 1/2015 | Hellenbrand et al. | |
| 2016/0236867 | A1 | 8/2016 | Brazeau et al. | |
| 2016/0305775 | A1 | 10/2016 | Allen | |
| 2017/0032306 | A1 | 2/2017 | Johnson et al. | |

| | | | | |
|---|---|---|---|---|
| 2017/0322561 | A1 | 11/2017 | Stiernagle | |
| 2017/0334644 | A1 * | 11/2017 | Otto | B65G 1/0492 |
| 2018/0057265 | A1 * | 3/2018 | Manpat | G05B 1/00 |
| 2018/0127211 | A1 | 5/2018 | Jarvis et al. | |
| 2018/0305124 | A1 | 10/2018 | Guo et al. | |

FOREIGN PATENT DOCUMENTS

| | | |
|---|---|---|
| CN | 2766681 Y | 3/2006 |
| CN | 1791540 A | 6/2006 |
| CN | 101397118 A | 4/2009 |
| CN | 102825496 A | 12/2012 |
| CN | 203229120 U | 10/2013 |
| CN | 104619613 A | 3/2014 |
| CN | 104619614 A | 3/2014 |
| CN | 103723421 A | 4/2014 |
| CN | 103723421 A | 4/2014 |
| CN | 104619614 A | 5/2015 |
| CN | 104777835 A | 7/2015 |
| CN | 104777835 A | 7/2015 |
| CN | 104837747 A | 8/2015 |
| CN | 204588619 U | 8/2015 |
| CN | 104875177 A | 9/2015 |
| CN | 104966186 A | 10/2015 |
| CN | 105600253 A | 5/2016 |
| CN | 105705441 A | 6/2016 |
| CN | 105752888 A | 7/2016 |
| CN | 105774859 A | 7/2016 |
| CN | 105775544 A | 7/2016 |
| CN | 205438526 A | 8/2016 |
| CN | 105945935 A | 9/2016 |
| CN | 106005866 A | 10/2016 |
| CN | 106044645 A | 10/2016 |
| CN | 107667061 A | 10/2016 |
| CN | 106081455 A | 11/2016 |
| CN | 106276011 A | 1/2017 |
| CN | 106379681 A | 2/2017 |
| CN | 106426077 A | 2/2017 |
| CN | 106429148 A | 2/2017 |
| CN | 106882553 A | 6/2017 |
| CN | 106882553 A | 6/2017 |
| CN | 106892014 A | 6/2017 |
| CN | 106927179 A | 7/2017 |
| CN | 206373907 U | 8/2017 |
| CN | 107226310 A | 10/2017 |
| CN | 206569571 U | 10/2017 |
| CN | 107336212 A | 11/2017 |
| CN | 107667061 A | 2/2018 |
| CN | 108069180 A | 5/2018 |
| CN | 108122016 A | 6/2018 |
| CN | 108190341 A | 6/2018 |
| CN | 108190341 A | 6/2018 |
| CN | 108217038 A | 6/2018 |
| CN | 108341201 A | 7/2018 |
| CN | 108383043 A | 8/2018 |
| CN | 108383043 A | 8/2018 |
| CN | 108408316 A | 8/2018 |
| CN | 207684811 U | 8/2018 |
| CN | 106379681 A | 9/2018 |
| CN | 209023571 U | 6/2019 |
| CN | 110498172 A | 11/2019 |
| CN | 110498172 A | 11/2019 |
| DE | 2034834 A1 | 1/1972 |
| DE | 29808762 U1 | 11/1998 |
| DE | 102011002322 A1 | 10/2012 |
| DE | 102014007539 A1 | 11/2015 |
| DE | 102017219739 A1 | 5/2019 |
| EP | 0302205 A2 | 2/1989 |
| EP | 0634115 A1 | 1/1995 |
| EP | 2008960 A2 | 12/2008 |
| EP | 2351698 A1 | 8/2011 |
| EP | 2634115 A1 | 9/2014 |
| EP | 3192616 A1 | 7/2017 |
| GB | 2080265 A | 2/1982 |
| GB | 2336838 A | 11/1999 |
| JP | S505311 U | 1/1975 |
| JP | 51060504 A | 3/1986 |
| JP | H03152007 A | 6/1991 |
| JP | H06239410 A | 8/1994 |

(56) References Cited

FOREIGN PATENT DOCUMENTS

| | | |
|---|---|---|
| JP | 1111611 A | 1/1999 |
| JP | H11011611 A | 1/1999 |
| JP | H1179321 A | 3/1999 |
| JP | 2003029837 A | 1/2003 |
| JP | 2006088235 A | 4/2006 |
| JP | 2006088235 A | 4/2006 |
| JP | 2008238959 A | 10/2008 |
| JP | 2010042921 A | 2/2010 |
| JP | 2012093278 A | 5/2012 |
| JP | 2013023320 A | 2/2013 |
| JP | 5413413 B2 | 2/2014 |
| JP | 2014051345 A | 3/2014 |
| JP | 2014051345 A | 3/2014 |
| JP | 2015124023 A | 7/2015 |
| JP | 2011020794 A | 2/2021 |
| KR | 101677497 B1 | 11/2016 |
| RU | 2404043 C1 | 11/2010 |
| SU | 867871 A1 | 9/1981 |
| SU | 1370017 A1 | 1/1988 |
| TW | 201643088 A | 12/2016 |
| TW | 201643088 A | 12/2016 |
| WO | 2011158422 A1 | 12/2011 |
| WO | 2014003417 A1 | 1/2014 |
| WO | 2014034174 A1 | 3/2014 |
| WO | WO-2014034174 A1 * | 3/2014 ............. B66F 9/141 |
| WO | 2016151505 A1 | 9/2016 |
| WO | 2017044747 A1 | 3/2017 |
| WO | 2017121747 A1 | 7/2017 |
| WO | 2017205390 A2 | 11/2017 |
| WO | 2018064639 A1 | 4/2018 |
| WO | 2018064839 A1 | 4/2018 |
| WO | 2018064839 A1 | 4/2018 |
| WO | 2018129738 A1 | 7/2018 |
| WO | 2018140471 A1 | 8/2018 |
| WO | 2019011276 A1 | 1/2019 |
| WO | 2019011276 A1 | 1/2019 |
| WO | WO-2019011276 A1 * | 1/2019 ............. B65G 47/90 |
| WO | 2019095803 A1 | 5/2019 |

\* cited by examiner

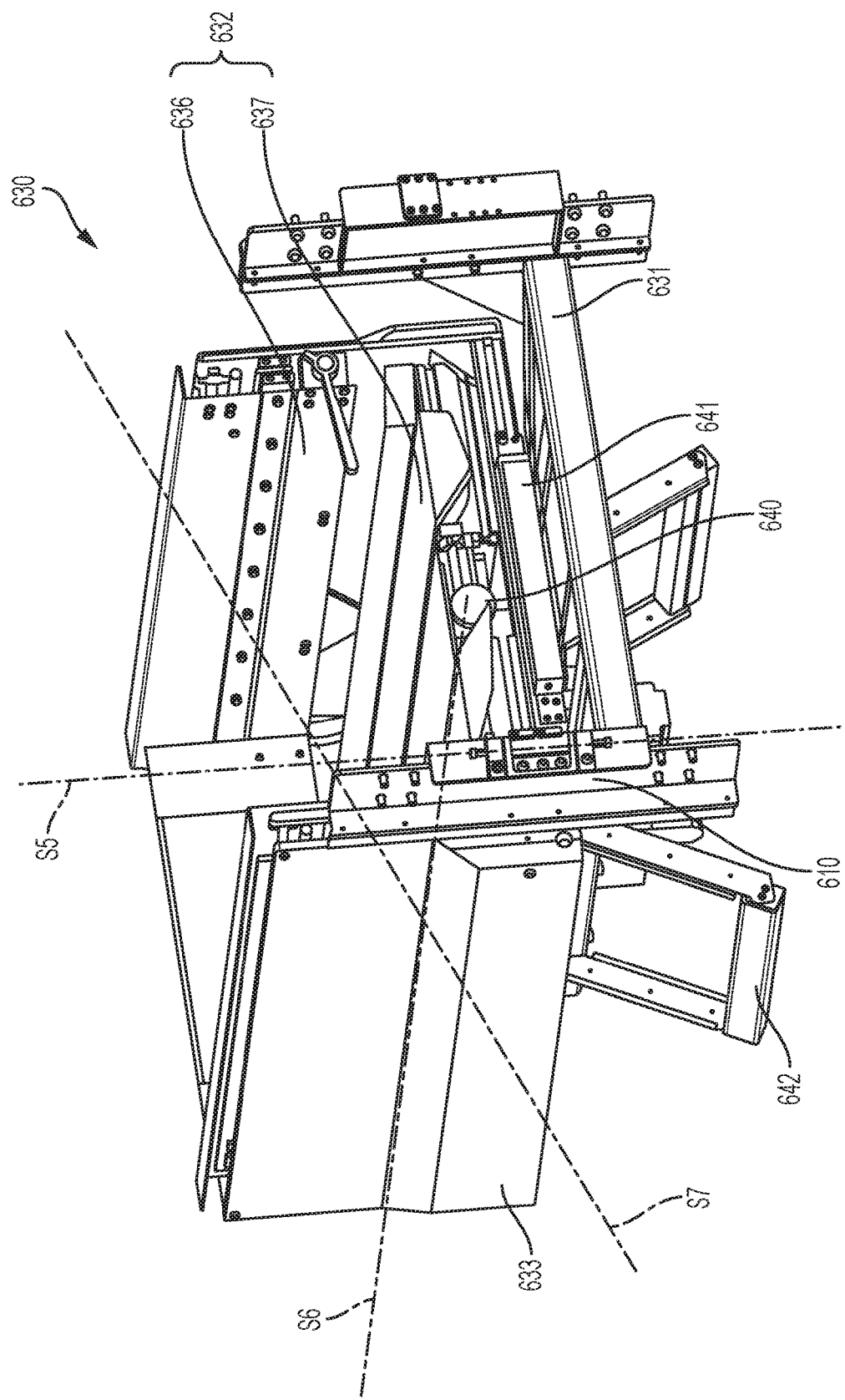

AUTOMATED GUIDED VEHICLE DESIGNED FOR WAREHOUSE

RELATED APPLICATIONS

This application claims priority under the Paris Convention to CN201711141498.3 filed on Nov. 14, 2017, titled Method and System for Automated Storing and Retrieving of Merchandise, and to CN2017111135812.7 filed on Nov. 14, 2017, titled Robotics, the entire content of both applications being incorporated herein in their entirety.

FIELD OF THE INVENTION

The present disclosure relates generally to warehouse automation systems, and more specifically to automated guided vehicle (AGV) designed to carry, store, and retrieve inventory items in a warehouse.

BACKGROUND OF THE INVENTION

Machines have been used in warehouses to carry goods from storage to loading dock, or vice versa. At the beginning, machines were mostly used to carry heavy cargos or bulky items to free humans from exhaustive labor. Recent developments in Artificial Intelligence and robotics have produced advanced machines that are looking to replace humans not just in industrial settings but also in many areas of daily life.

While there are many reports of advancement in automation and AI, precision and agility still are two areas in which robotics lags behind human. In a warehouse setting, a fully automated machine that can take an order, go and fetch an item from storage and deliver the item to a designated place is more science fiction than reality. Certain well-known systems, such as KIVA systems, can accomplish simple mechanical movements of carrying bulky shelves from one designated location to another. However, functions of a fully automated system, such as fetching an inventory item from a specified shelf and putting an inventory item away into storage while being able to navigate through a crowded warehouse full of obstacles and capable of handling inventory items that have shifted positions, have yet to be realized in a commercially available warehouse robotic system.

SUMMARY OF THE INVENTION

Accordingly, one of the objectives of the present disclosure is to teach an intelligent automated guided vehicle that can store and retrieve inventory items as instructed. The AGV systems disclosed herein are agile, efficient and error-tolerant, and are especially suited to be used in a warehouse lined with storage shelves.

In some embodiments, an Automated Guided Vehicle (AGV) designed for storing or retrieving inventory items as disclosed comprises a drive unit, a multi-level frame, and a material handling device. The drive unit is configured to drive the AGV. In some embodiments, the drive unit may comprise a motor and one or more drive wheels. In some embodiments, the multi-level frame includes one or more plates for holding one or more inventory items. The multi-level frame also includes a lifting device for lifting the material handling device. The material handling device includes a tray, a retractable device, and a lateral device. The tray is configured to hold an inventory item. The retractable device is connected to the tray and is configured to extend and retract. The lateral device is configured to move the tray to either the right side or the left side. As the retractable device extends, the retractable device reaches inside a shelf, to either place an item on the shelf or fetch an item from the shelf. In one embodiment, as the retractable device retracts, the lateral device returns to its original place. In another embodiment, the lateral device may return with a piece of inventory item picked up from the shelf and place the inventory item on one of the plates of the multi-level frame. The AGV is configured to move between two warehouse shelves and to store or retrieve inventory items from either shelve using the material handling device.

In some embodiments, the multi-level frame is installed on the drive unit and the multi-level frame comprises supporting columns to accommodate the lifting device. The lifting device may be configured to move along the supporting columns and stop at each level of the multi-level frame. The lifting device may be configured to lift the material handling device to a height to store or retrieve an inventory item at or from a warehouse shelf. The height may be determined based on the position of the inventory item. The height may also be determined based on the position of one of the plates on the multi-level frame. When the material handling device is lifted to the height of the plate, the material handling device is configured to place an inventory item on the plate through retraction of the retractable device, or to fetch an inventory item from a shelf through extension of the retractable device. In some embodiments, the retractable device can extend to two or more positions. In one embodiment, the lateral device of the material handling device is configured to rotate the tray to either the right or left side by 90°. In another embodiment, the lateral device of the material handling device is configured to translate the tray to the right side or the left side. In some embodiments, the material handling device is configured to extend to the second position after turning 90° in order to reach inside a shelf.

In some embodiments, the AGV further comprises a transceiver for transmitting and receiving instructions to or from a warehouse server, and processors configured to control the AGV. The transceiver is configured to receive an instruction to transport an inventory item. The processors are configured to interpret the instruction to obtain a position of the inventory item. In one embodiment, the position of the inventory item comprises an x-coordinate, a y-coordinate, an orientation of the inventory item, and a height.

In some embodiments, the AGV comprises a navigation unit configured to detect obstacles and determine a moving path for the AGV based on the position of the inventory item. The navigation unit may be configured to read navigation signs posted inside the warehouse for navigation purpose. Examples of navigation signs may include barcodes, two-dimensional barcodes, and other identification codes.

In one embodiment, when the AGV is navigating toward the position of the inventory item, the processors are configured to command the material handling device to move to the height specified in the position of the inventory item, before the AGV reaches the position of the inventory item.

In one embodiment, the retractable device of the material handling device extends the tray to reach the inventory item when the AGV reaches the position of the inventory item. In one embodiment, the tray is configured to clamp the inventory item to move the inventory item onto or away from the tray. In another embodiment, the tray is configured to slide underneath the inventory item and lift the inventory item. The tray may further comprise some mechanism to facilitate pushing or pulling of the inventory item. For example, the tray may be equipped with a mechanical arm or fork that can open or fold to clamp, pull, or lift the item.

In some embodiments, the AGV further comprises a shift detection device configured to detect a position shift of the inventory item compared to the position obtained from the instruction received by the AGV. Based on the position shift, the processors are configured to adjust the position of the AGV or the position of the material handling device to allow the material handling device to reach the inventory item for transportation. The shift detection device may use one or more of the following: a laser device, a radar device, a lighting device, a barcode reader, and a graph recognition device, for detecting the position shift.

In some embodiment, an Automated Guided Vehicle (AGV) system for storing or retrieving an inventory item in a warehouse may comprise a drive unit configured to drive the AGV, a multi-level frame comprising one or more plates for holding one or more inventory items and a lifting device. The AGV may further comprise a material handling device, a transceiver, and one or more processors. The material handling device may further comprise a tray, a retractable device, and a lateral device. The tray is for holding an inventory item. The lateral device is configured to move the tray in a lateral direction, either to the right side or left side of the AGV system. The retractable device is configured to extend and retract perpendicular to the lateral direction. In some embodiments, the lateral device rotates the tray either to the left or to the right. In some embodiments, the lateral device translates the tray parallelly either to the left or to the right. The transceiver is configured for communicating with a warehouse server and the one or more processors are configured to control the AGV. The AGV system is configured to navigate inside a warehouse between storage shelves and to reach inside storage shelves laterally. The lifting device of the multi-level frame is configured to move the material handling device vertically and to stop at each level of the multi-level frame or at a specified height. In one embodiment, the lateral device of the material handling device is configured to rotate the lifting device by 90° to the right side or left side.

In some embodiments, the transceiver is configured to receive an instruction of transporting an inventory item and the one or more processors are configured to obtain the position of the inventory item from the received instruction.

In some embodiments, the AGV system may further include a shift detection device for detecting a position shift of the inventory item. The one or more processors are configured to adjust, based on the position shift, the position of the AGV and the position of the lifting device to allow the material device to reach the inventory item for transportation. The shift detection device may use one or more of the following devices: a laser device, a radar device, a lighting device, a barcode reader, and a graph recognition device, for detecting the position shift.

The present disclosure further discloses a method of controlling a warehouse robot to store or retrieve an inventory item on a shelf. The method comprises the following steps. First, the warehouse robot receives an instruction to transport the inventory item. The robot obtains a position of the inventory item from the received instruction. The position of the inventory item comprises a location of the inventory item and an orientation of the inventory item. After interpreting the instruction, the warehouse robot moves to the location of the inventory item. Before reaching for the inventory item, the warehouse robot may try to detect a position shift of the inventory item away from the obtained position. The position shift may include a deviation in the location and/or a change of the orientation of the inventory item and/or a bias of height. In some embodiments, the processors are configured to report the position shift to a server. If there is a position shift, the warehouse robot adjusts its position and/or the position of the material handling device. In some embodiments, the warehouse robot may adjust itself to compensate the orientation and/or position and/or height shift of the inventory item. After the position shift has been compensated, the warehouse robot reaches for the inventory item and retrieves it from storage shelf. The warehouse robot then transports the inventory item to a destination. When the warehouse robot reaches inside the shelf to place or fetch the inventory item, the lateral device of the material handling device moves in a lateral direction, therefore the warehouse robot does not need to turn around to face the shelf before reaching for the inventory item.

In some embodiments, the adjusting of the position of the warehouse robot to compensate for the position includes the following steps: comparing the position shift to a threshold; if the position shift is larger than the threshold, adjusting the position of the warehouse robot based on the position shift; re-measuring the position shift; and adjusting the position of the warehouse robot until the measured position shift is smaller than the threshold.

In some embodiments, the shelves used in a warehouse may allow two or more rows of inventory items to be arranged on the shelves. In such warehouse, a warehouse robot and the position information stored for each inventory item are modified or adapted to accommodate double-row deep shelves. In a method of controlling a warehouse robot to store or retrieve an inventory item placed on such shelf, the warehouse robot first receives an instruction to transport the first inventory item. The instruction may include the position of the first inventory item such as the location, the depth, and the orientation of the first inventory item. If the depth of the first inventory item indicates that the item is in the front row of the shelf, the robot's fetching process is the same as previously described. If the depth of the first inventory item indicates that the item is at the back row of the shelf, the robot's fetching process may require the robot to remove the inventory item in the front row in order to reach to the first inventory item in the back row. In some configurations, the robot is configured to take the second inventory item in the front row and place it on one of its empty trays, and then fetch the first inventory item from the back row and place it on another of its empty trays. After that, the robot returns the front row item to the front row. Indeed, if the robot is instructed to fetch both the first and second inventory items and they happen to be at the same location but in different rows, the robot doesn't need to return the second inventory item back to the shelf.

BRIEF DESCRIPTION OF THE DRAWINGS

These and other features of the present disclosure will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

FIG. 6a-FIG. 6d are illustrations of parts of an exemplary material handling device.

DETAILED DESCRIPTION

Embodiments of the disclosure are described more fully hereinafter with reference to the accompanying drawings, in which preferred embodiments of the disclosure are shown. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1:
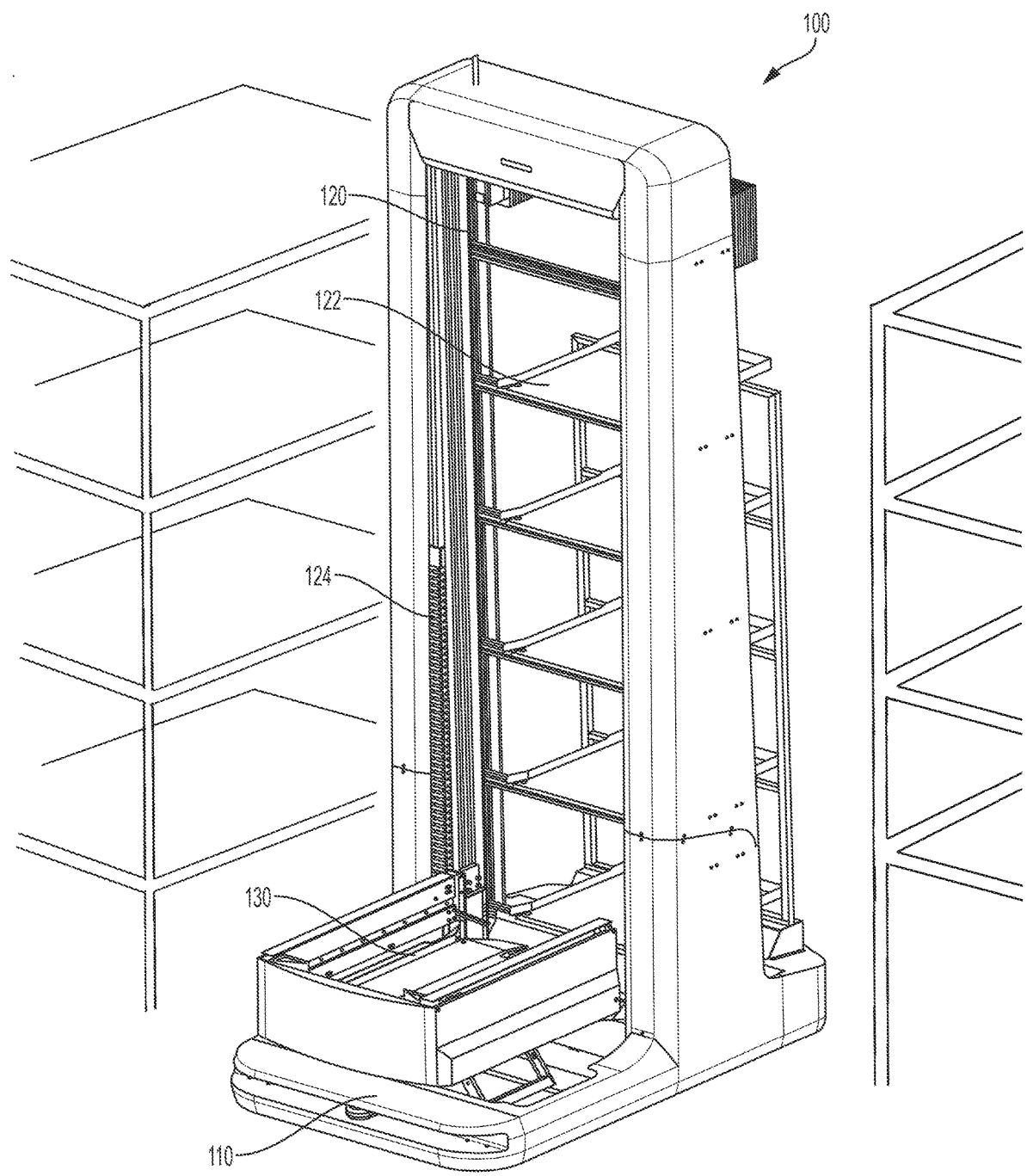
FIG. 1 is an illustration of an exemplary AGV designed for warehouses.

In referring to FIG. 1, an exemplary AGV 100 comprises a drive unit 110, a multi-level frame 120, and a material handling device 130. The drive unit 110 is configured to drive and propel the AGV 100. The multi-level frame 120 comprises one or more plates 122 and a lifting device 124. The lifting device 124 is connected to a material handling device 130 and can lift or lower the material handling device 130. The material handling device 130 comprises a tray, a lateral device, and a retractable device that are illustrated in FIGS. 6a-6d and will be explained in later sections of this disclosure.

Figure 2:
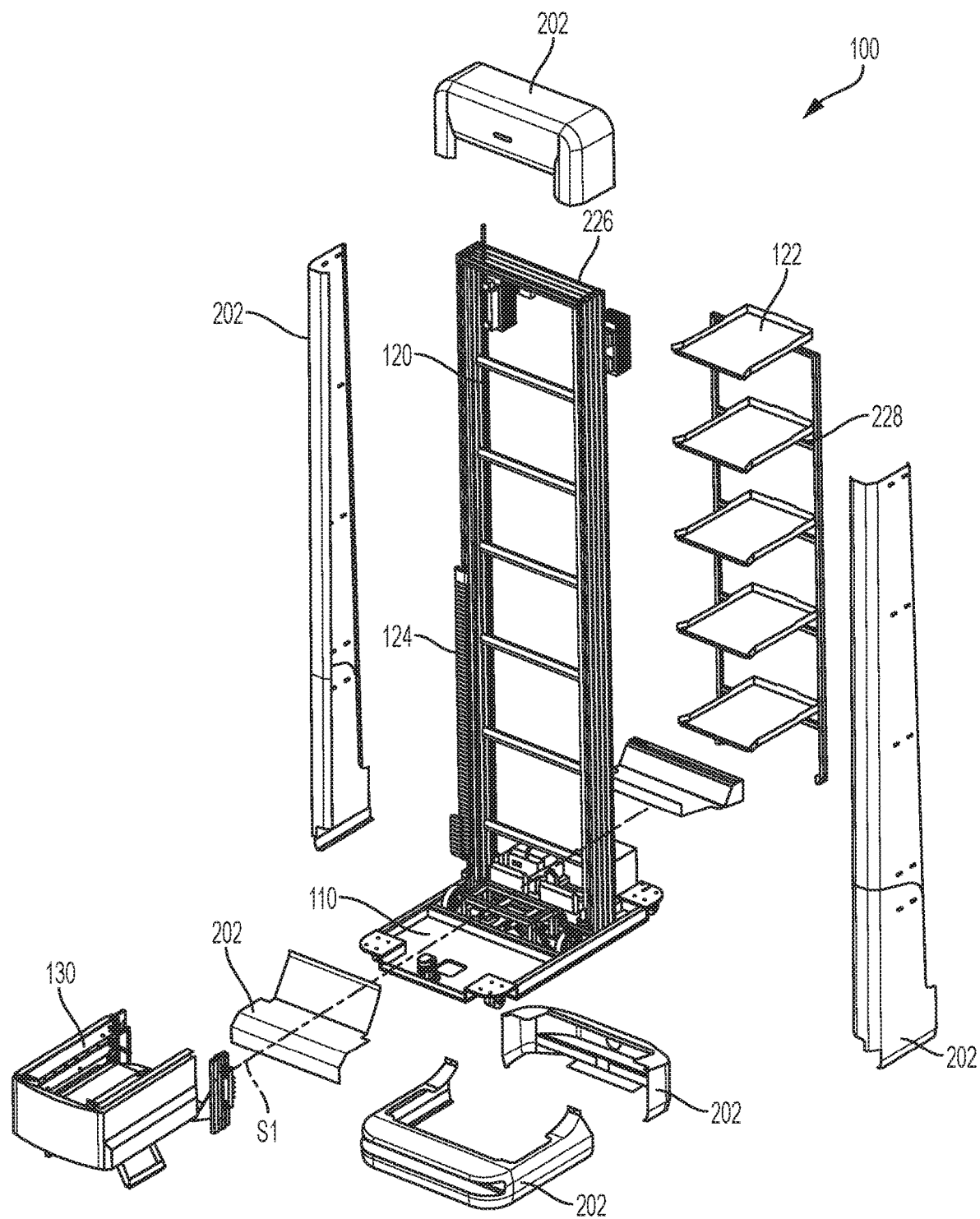
FIG. 2 is an exploded view of an exemplary warehouse AGV robot.
Figure 3:
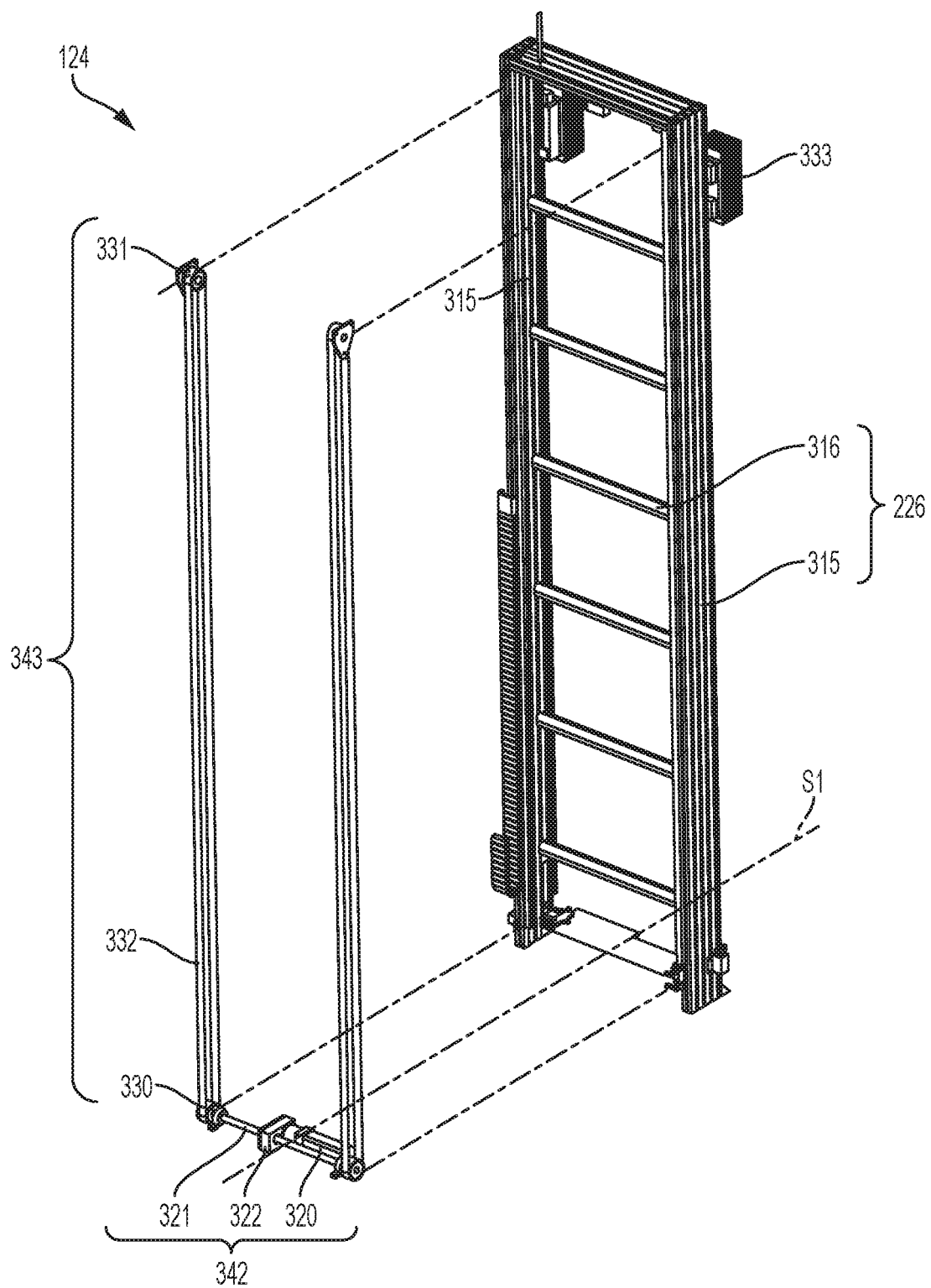
FIG. 3 is an exemplary illustration of the lifting device as part of the multi-level frame.

FIG. 2 is an exploded view of an exemplary AGV 100. FIG. 2 illustrates the interior components inside the covers 202. In FIG. 2, the multi-level frame 120 is shown as comprising a standing frame 226, a shelf 228 holding the plates 122, and the lifting device 124. FIG. 3 illustrates more details of the standing frame 226 and the lifting device 124. The standing frame 226 includes two supporting columns 315 and multiple supporting bars 316. The lifting device 124 includes two synchronous wheel drive sets 343 and a lifting drive mechanism 342.

The two synchronous wheel drive sets 343 are installed on the supporting columns 315. In some embodiments, the lifting device 124 may include more than two synchronous wheel drive sets 343. As shown in FIG. 3, each of the synchronous wheel drive set 343 includes a tension wheel 331, a driving synchronous wheel 330, and a synchronous belt 332. The synchronous wheel drive set 343 is connected to a lifting drive mechanism 342. The lifting drive mechanism 342 drives the driving synchronous wheel 330 to move the belt 332 in order to lift the material handing device 130 up and down the multi-level frame 120. In FIG. 3, the exemplary lifting drive mechanism 342 includes an electric motor 320, a drive shaft 321, and a gearbox 322. In some embodiments, the electric motor 320 can be replaced with a hydraulic drive system or an air motor or any other type of motors. The drive shaft 321 connects the driving synchronous wheel 330 to the electric motor 320 via the gearbox 322 and conveys the kinetic energy from the motor 320 to the driving synchronous wheel 330 to drive the lifting device 124. In some embodiments, the drive shaft 321 is connected to two driving synchronous wheels (not shown) and ensures that the two wheels are moving synchronously. In FIG. 3, two counterweights 333 are installed at the top of the multi-level frame 120. The counterweights can move along the standing columns 315 and can control and buffer the movement and momentum of the lifting device 124 because of the weight carried by the counterweights 333. It is noted that in FIG. 3, the lifting device 124 is implemented as a synchronous wheel drive system. Other mechanisms using sprocket, rack and pinion, turbine worm, and/or lifting screw can be used to implement the lifting device 124 as well.

The drive unit 110 is laid open in FIG. 2 after shifting the material handling device 130 aside. The details of the drive unit 110 are illustrated in an exploded view of the drive unit 110 in FIG. 4. The drive unit 110 in FIG. 4 includes a base 422, a shaft seat 415, and a shock absorber bracket 425. The standing columns 315 are fixated on the base 422 to allow the multi-level frame 120 to be installed on the drive unit 110.

The base 422 has two surfaces, an upper surface 421 and an under surface 420. On the upper surface 421 of the base 422, the shaft seat 415 and the shock absorber bracket 425 are used to accommodate two driving wheels 413 through the driving wheel socket 423 and the installation socket 424. The installation socket 424 is in the middle of the base 422 and the two driving wheels 413 are underneath the installation socket 424 supporting the base 422. Four driven wheels 412 are also installed in the four corners of the base 422 to provide support and ease of movement. The four driven wheels 412 are installed in the driven wheel sockets 426. In some embodiments, there may be more than four or fewer than four driven wheels. The driven wheels may be omni-directional wheels or other types of steering wheels.

Figure 4:
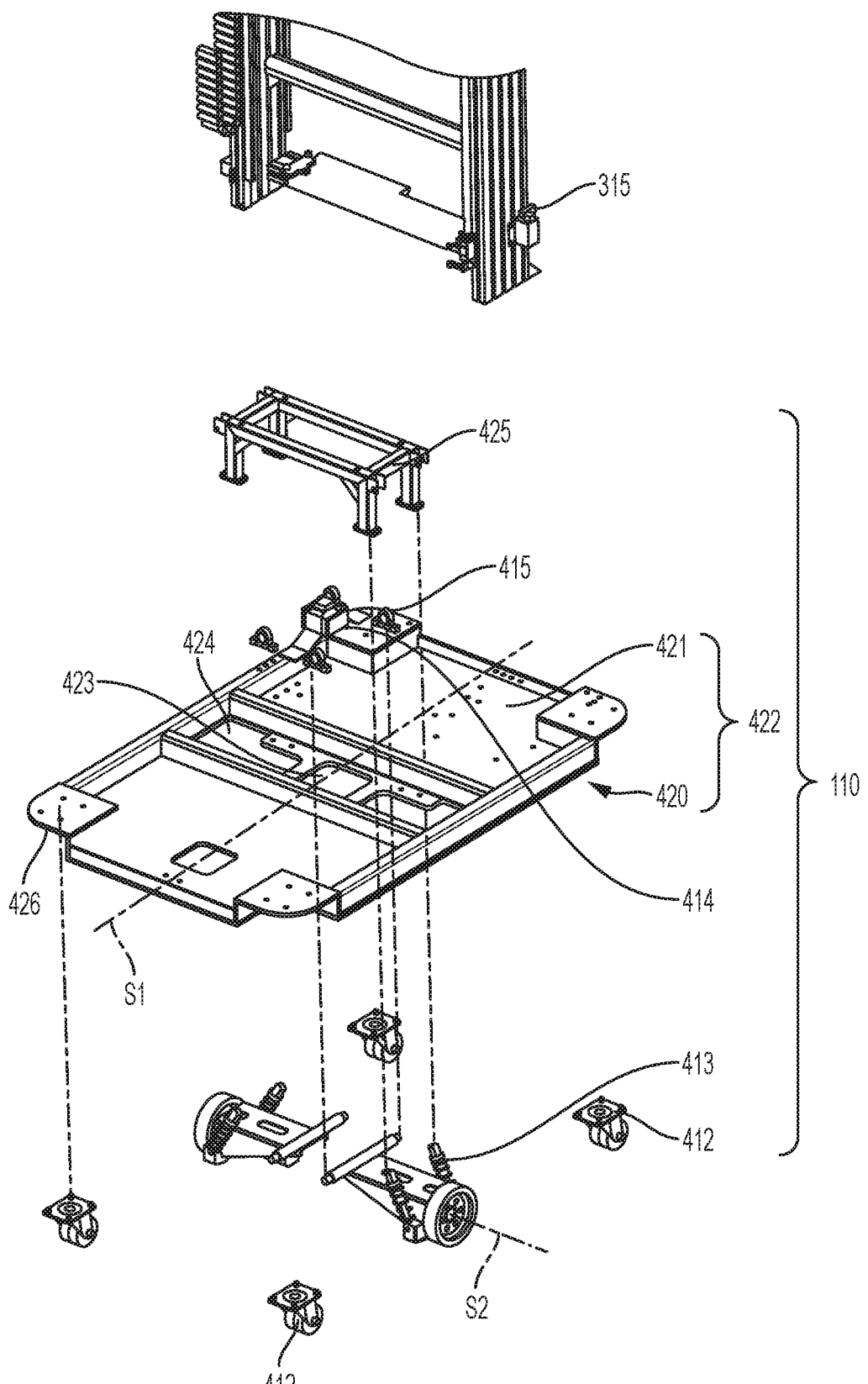
FIG. 4 is an exemplary illustration of the drive unit.
Figure 5:
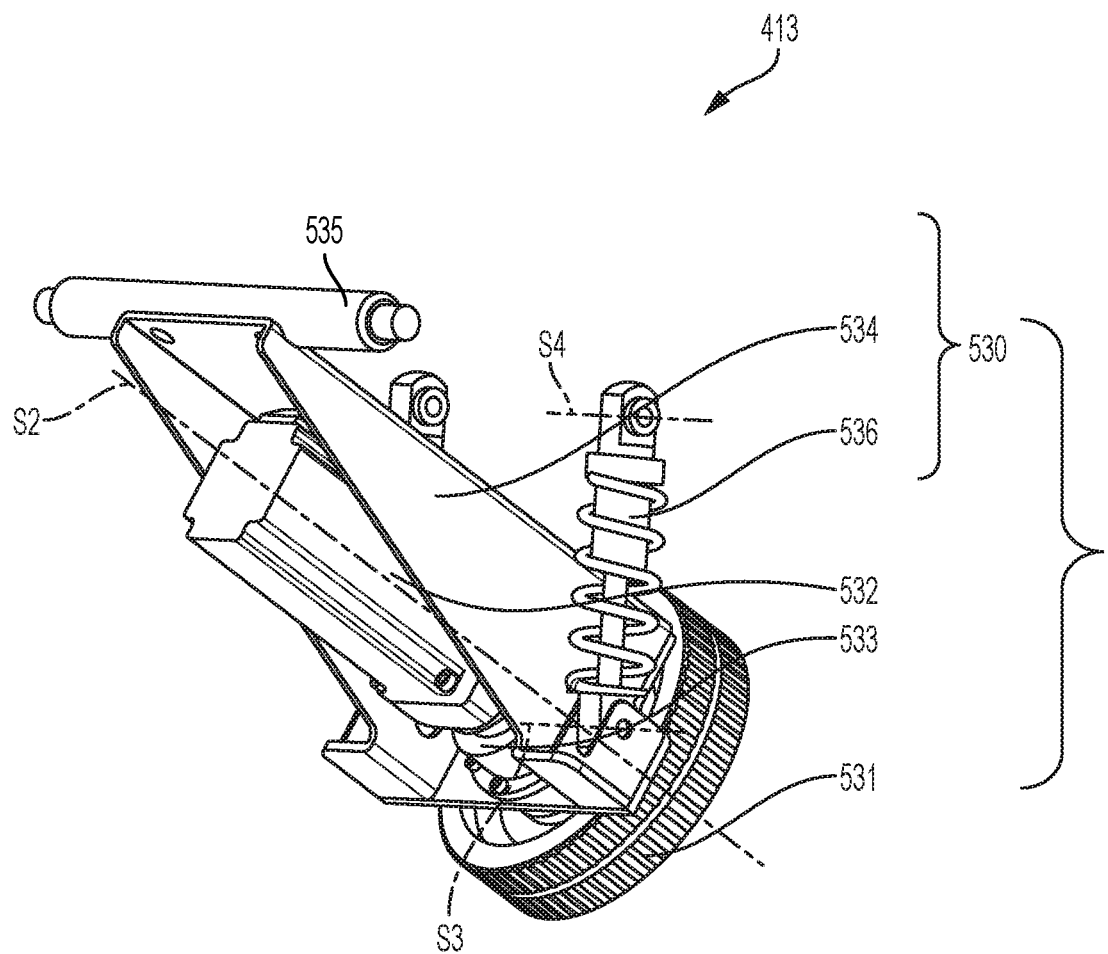
FIG. 5 is an exemplary illustration of the motor used in the drive unit.

FIG. 5 illustrates an embodiment of the driving wheel 413. The driving wheel 413 comprises a driving wheel bracket 530, a driving wheel body 531, a hub driving device 532, and a hub reduction device 533. The driving wheel bracket 530 comprises a pair of wheel brackets 534, an axle body 535, and a pair of shock absorbers 536. The hub driving device 532 is installed in the middle of the driving wheel bracket 530 along the central axis S2. The hub driving device 532 is connected to the driving wheel body 531 and provides the driving force to propel the driving wheel 413. The hub driving device 532 sits between the wheel brackets 534. The two shock absorbers 536 are located on the side of each of the wheel brackets 534 respectively. The shock absorbers 536 are connected to the shock absorber bracket 425 shown in FIG. 4, through the installation socket 424. The wheel bracket 534 are connected to the axle body 535, which are connected to the shaft seat 415 also through the installation socket 424. The shock absorber 536 and the wheel bracket 534 form an angle. Such structure can be used to absorb shocks or eccentric force, especially when the AGV 100 is turning. In some embodiment, the hub driving device 532 may be an electric motor, a hydraulic drive system, an air motor, or other types of motors.

As shown in FIG. 1, the exemplary AGV 100 comprises the multi-level frame 120 illustrated in FIG. 2 and FIG. 3, the drive unit 110 illustrated in FIG. 4, and the material handling device 130 illustrated in FIGS. 6a-6d.

In FIG. 6a, the material handling device 130 is shown to comprise a tray 633, arms 632, a support frame 631, two slides 610, a camera set 640, primary lighting equipment 641 and secondary lighting equipment 642. There are two arms 632, one on each side of the tray 633. but only one is shown in FIG. 6a. Also, only one of the two slides 610 is shown in FIG. 6a.

In FIG. 6a, three axes S5, S6, and S7 are shown. The material handling device 130 can retract or extend along S6 through movements of the slides 610. The material handling device 130 can also move laterally in a transverse direction. In some embodiments, to achieve the lateral movements, the material handling device 130 may be configured to rotate around S5. In one embodiment, the material handling device 130 is configured to turn the tray 633 either to the left side or right side by 90°. In some other embodiments, to achieve the lateral movement, the material handling device 130 may be configured to translate the tray 633 either to the left or to the right. To translate the tray 633, the material handling device 130 moves the tray 633 parallelly along S7.

Figure 6B:
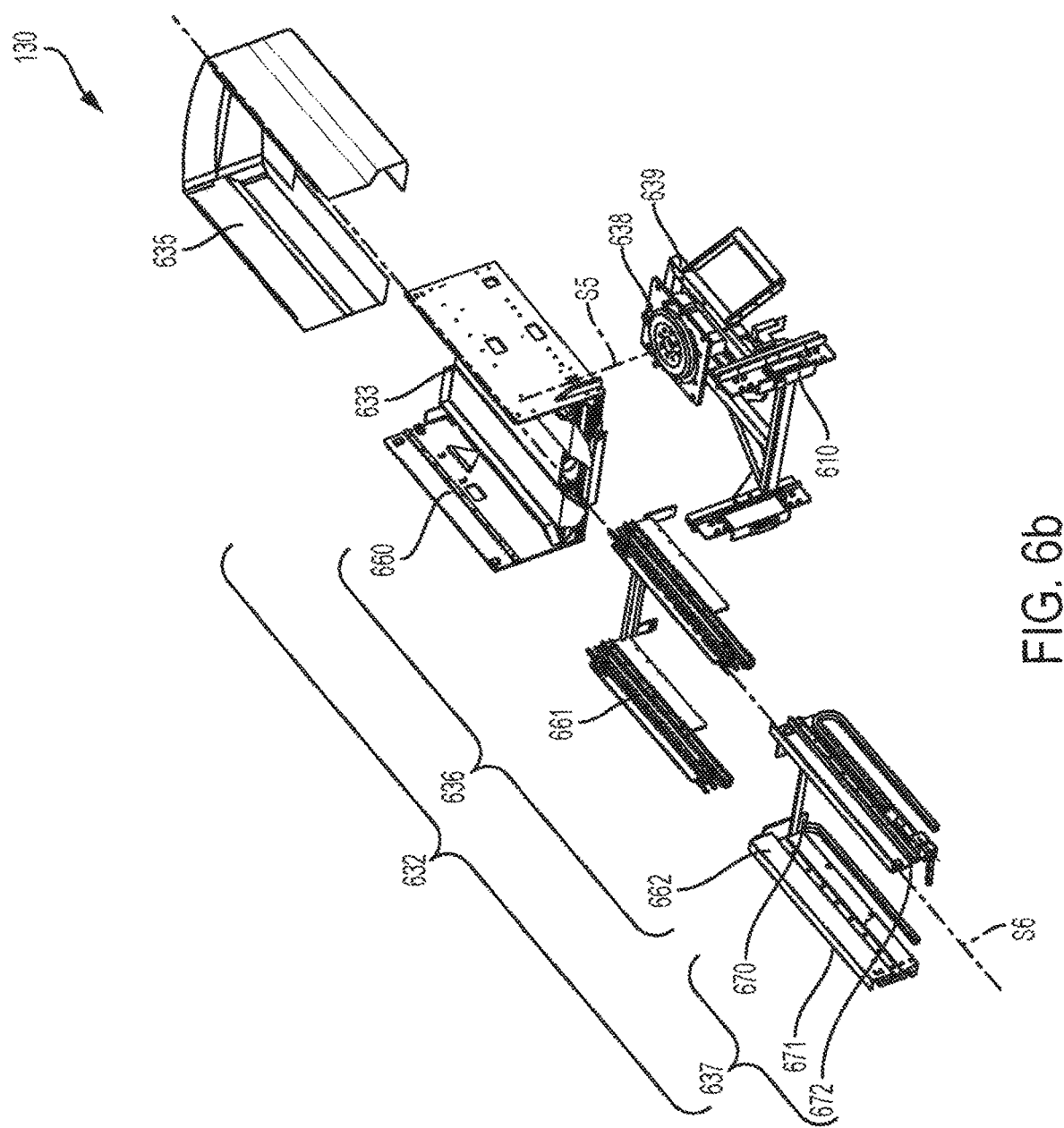

The arm 632 is configured to retract or extend along the slides 610 and to move the tray 633 along the S6 axis. The arm 632 comprises a telescopic arm 636 and a pusher assembly 637 that are used to accomplish the movements of retraction and extension. FIG. 6b illustrates an exploded view of an exemplary material handling device 130. Five parts of the material handling device 130 are depicted in the exploded view in FIG. 6b to show the detailed components in each part. In FIG. 6a, the tray 633 is depicted on top of the slides 610. The tray 633 is moved aside to expose the structure of the slide 610 in FIG. 6b.

Figure 7:
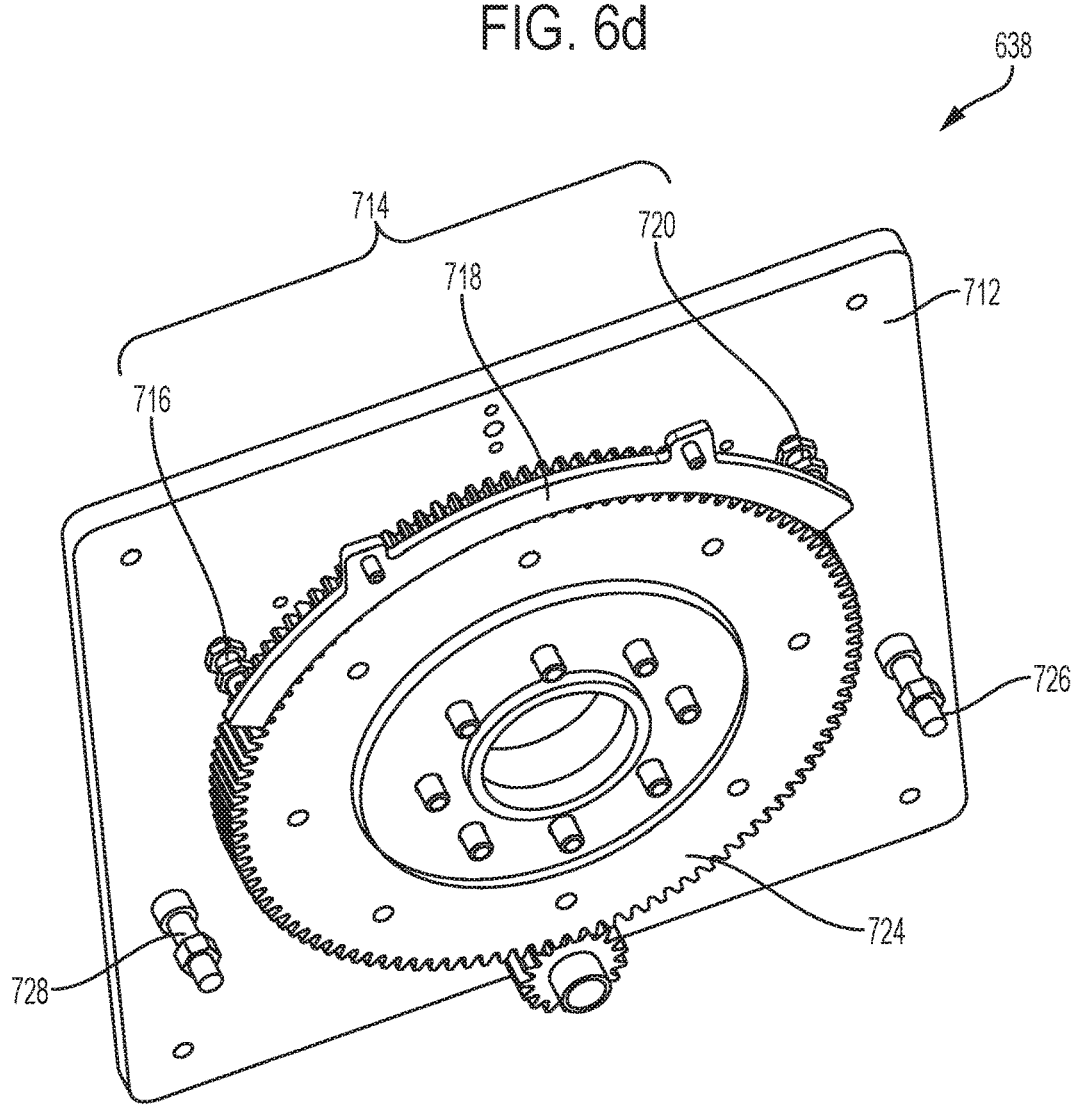
FIG. 7 is an illustration of a first embodiment of the lateral device in an exemplary material handling device.
Figure 8:
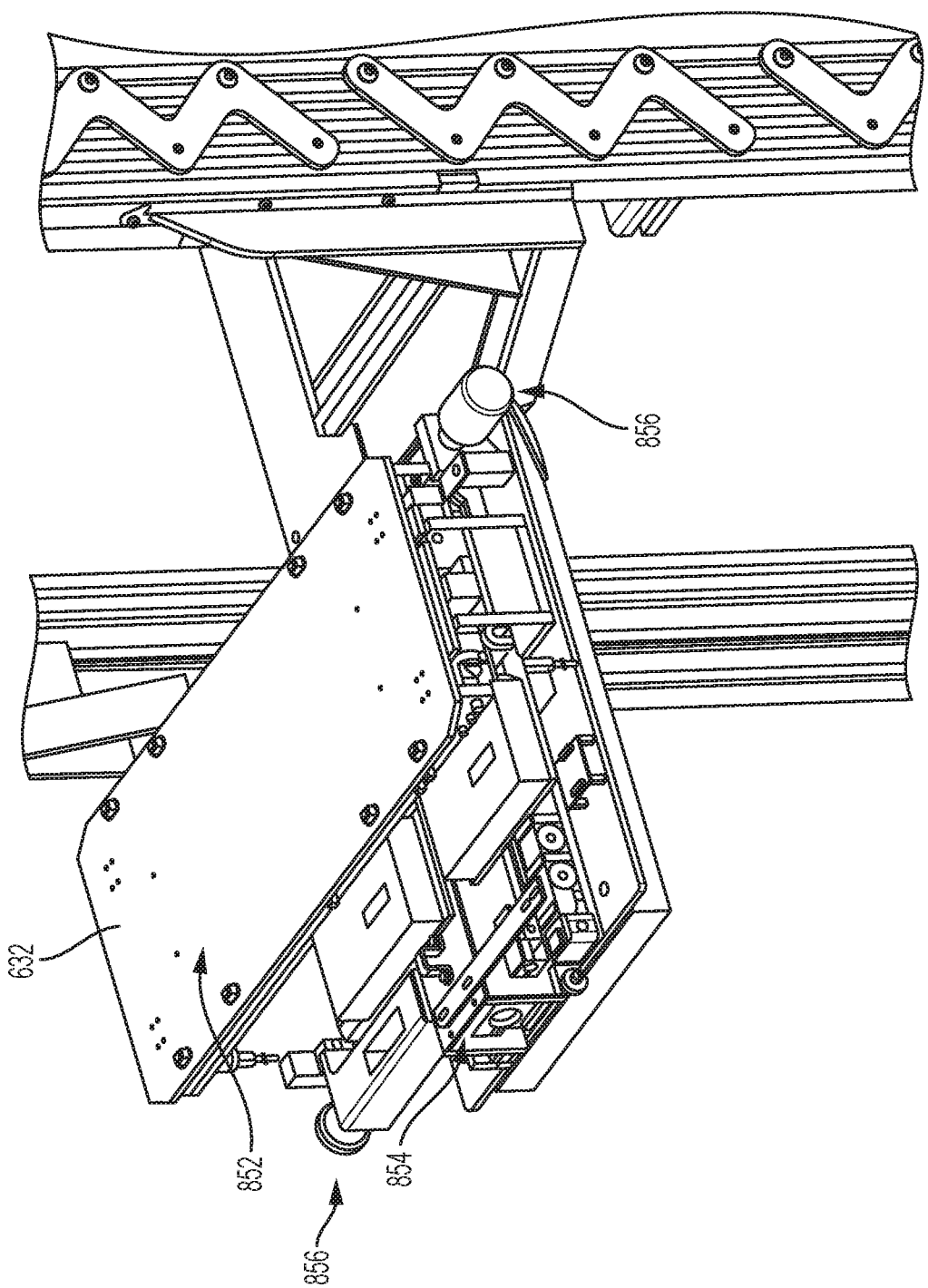
FIG. 8 is an illustration of a second embodiment of the lateral device in an exemplary material handling device.

In FIG. 6b, the slides 610 are connected to a rotation assembly 638 and a lift fork 639. The rotation assembly 638 is configured to rotate the tray 633 around the axis S5. The details of the rotational assembly 638 are illustrated in FIG. 7 and explained below. In some embodiments, the material handling device 130 translates the tray 633 instead of rotating the tray 633, as illustrated in FIG. 8. The slides 610 are part of the retraction device mentioned in other sections of this disclosure. The rotational assembly 638 is part of the lateral device mentioned in other sections of this disclosure. Another embodiment of the lateral device is shown in FIG. 8.

In FIG. 6b, the pusher assembly 637 is shown to comprise a fixed push rod 670, a moving push rod 671, a driving device 672, and an inner arm section 662. The inner arm section 662 can be fitted into the middle arm section 661, which can in turn be fitted onto the outer arm section 660. The driving device 672 can drive the moving push rod 671 to open or close relative to the inner arm section 662. The moving push rod 671 can be used to move an inventory item onto the tray 633 or away from the tray 633. The protection board 635 shown in FIG. 6b is installed around the tray 633 and can prevent the content of the tray 633 from falling off.

Figure 6C:
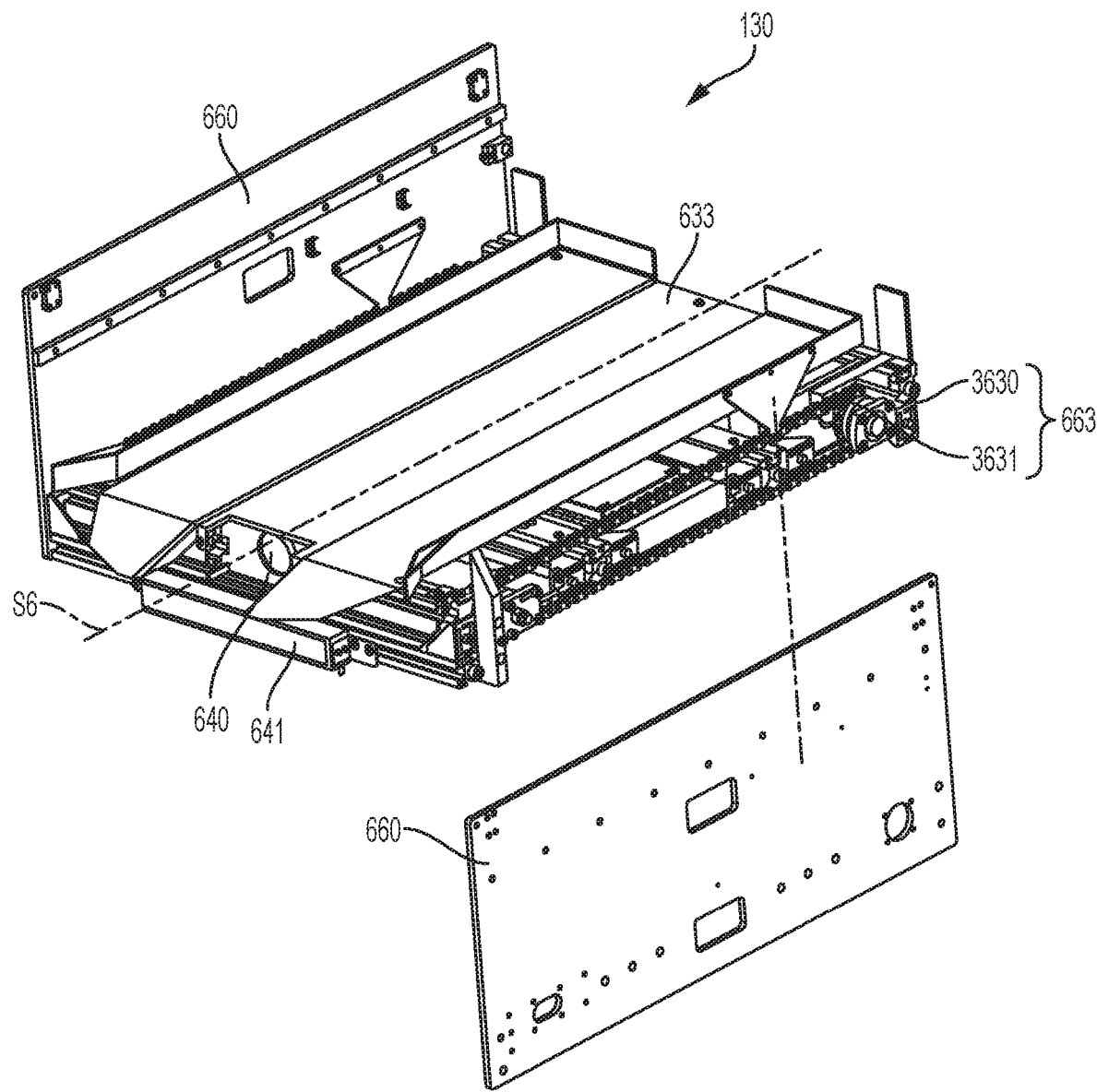
Figure 6D:
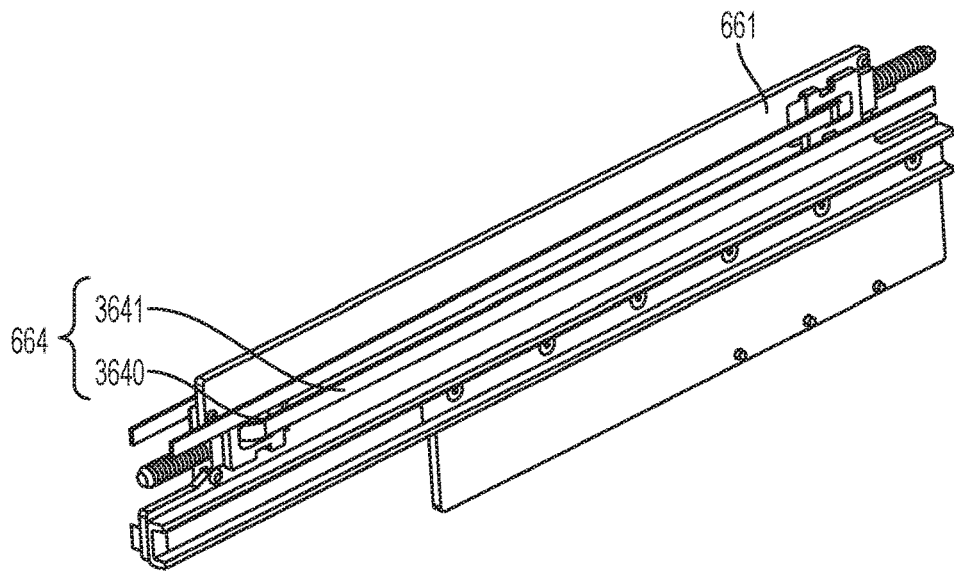

FIG. 6c provides another enlarged view of the material handling device 130. Two outer arm sections 660 are installed on either side of the tray 633. The camera set 640 and the primary lighting device 641 are installed at the front of the material handling device 130. FIG. 6c also depicts a first driving device 663 that is connected to the outer arm section 660. FIG. 6d depicts a second driving device 664 that is connected to the middle arm section 661. Each of the first driving device 663 and the second driving device 664 comprises a telescopic drive device (3631, 3641 respectively) and a sprocket chain device (3630, 3640 respectively). In some embodiments, the first driving device 663 may include a sprocket chain device while the second driving device 664 may include a flat belt device (not shown). In some embodiments, instead of sprocket chain device or flat belt device, the first or second driving devices 663 or 664 may include an open loop flat belt device (not shown) to facilitate the extension or retraction movement of the material handling device 130.

As mentioned above, the material handling device 130 can be configured to rotate the tray 633 or translate the tray 633 in order to achieve the lateral movement in the process of storing or retrieving an inventory item. In a crowded warehouse where storage shelves are arranged in rows, a material handling device 130 that can reach inside a storage shelf with lateral movements is particularly advantageous. As the AGV 100 moves in between two storage shelves, the material handling device 130 can either rotate the tray 633 or translate the tray 633 to either the right side or left side without turning the entire AGV 100. Because the AGV 100 does not require space for turning, the space between the shelves can be as narrow as the width of the AGV 100. In this way, the AGV 100 requires less space than regular warehouse robots as it moves in between the shelves and picks up or put away inventory items. FIG. 7 and FIG. 8 illustrate two exemplary embodiments used to achieve lateral movements of the material handling device 130.

FIG. 7 illustrates the rotational assembly 638 shown in FIG. 6b. In FIG. 7, the rotational assembly 638 includes a rotation driving device 712 and a positioning device 714. The rotation driving device 712 comprises a driving motor (not shown) and a set of driving gears 724. Examples of the driving motor include electric motor, hydraulic driving system, or air motor. Examples of the driving gears may include turbine shaft, planetary wheel, or other types of gears. The positioning device 714 comprises a first angle sensor 716, a second angle sensor 720, a first proximity switch 726, a second proximity switch 728, and a detection board 718. The positioning device 714 further includes a rotation controller that is not shown in FIG. 7.

The first angle sensor 716 and the second angle sensor 720 are positioned on the circumference of the driving gear 724 and separated by some distance. The two sensors are used to detect whether the tray 633 of the material handling device 130 has turned to a specific position. As the tray 633 is driven by the driving device 712, the first and second proximity switches 726, 728, move with the tray 633. By determining which of the first or second angle sensor 716 or 720 detects which of the first or second proximity switches 726 or 728 at what time, the amount of angle rotation by the tray 633 can be detected and controlled by the rotation controller.

In some embodiments, the rotation controller of FIG. 7 controls the arm 632 and the tray 633 to rotate to the right or the left by 90°, providing the lateral movement of the material handling device 130 to reach laterally to the shelf either on the right side or the left side. FIG. 8 illustrates a different mechanism than the rotational assembly 638, which can also be used to provide lateral movements to the tray 633.

In FIG. 8, the arm 632 comprises two sliding mechanisms, 852 for x-axis movement and 854 for y-axis movement. The sliding mechanism 852 moves the arm 632 to allow the arm 632 extend or retract. The sliding mechanism 854 moves the arm 632 laterally either to the left side or to the right side. In FIG. 8, two camera sets 856 are installed on either side of the arm 632 for optical detection. As compared to the material handling device 130 depicted in FIG. 6a, which can be configured to rotate by 90° either to the left side or to the right side, the material handling device 130 driven by the system shown in FIG. 8 does not rotate, but only slides to either the left side or the right side. Therefore, in FIG. 6a, only one camera set 640 is needed at the front of the material handling device 130, while in FIG. 8, two camera sets 856 are installed on both sides of the arm 632.

Figure 9:
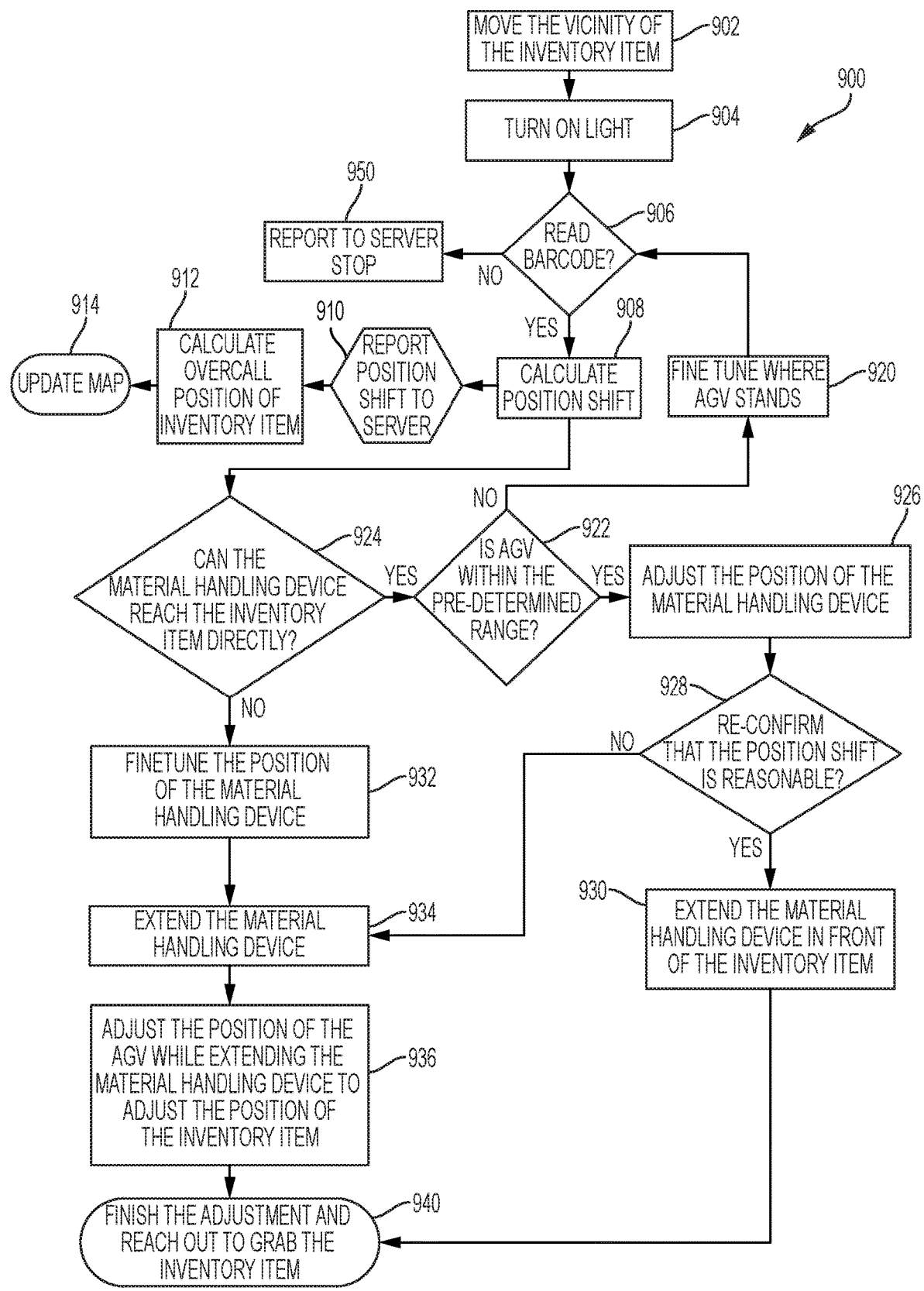
FIG. 9 is a flow chart illustrating a process of a warehouse AGV handling an order of retrieving an inventory item.
Figure 10:
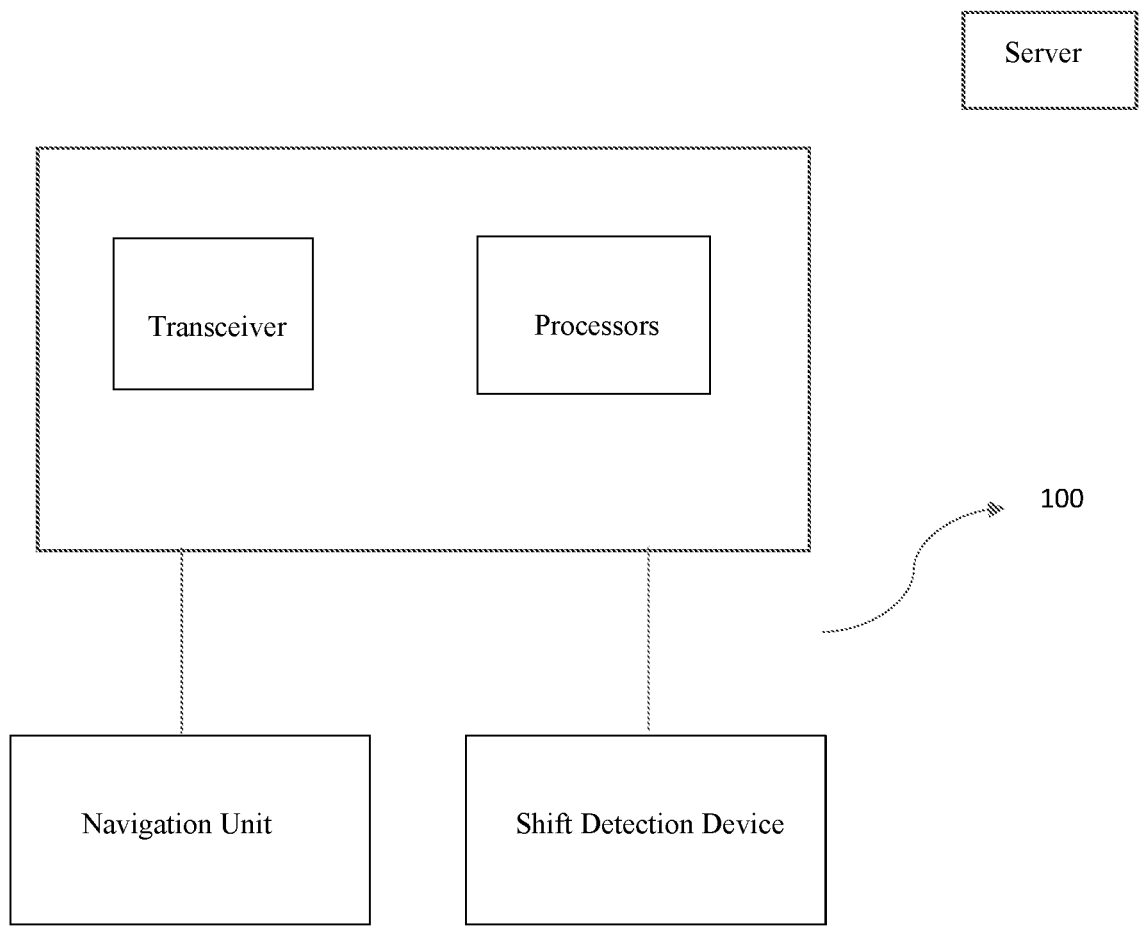
FIG. 10 is a schematic diagram of several control components in an embodiment of the warehouse AGV described in the present application.

FIGS. 1-8 illustrate an advanced AGV 100 that is agile and nimble. FIG. 9 illustrates a flow chart of the process in which the AGV 100 stores or retrieves inventory items. For illustration purposes, FIG. 9 shows only the process of retrieving an item. The process of storing an inventory item is similar and for reasons of simplicity, is not described in detail. A person skilled in the art would be able to derive the process of storing an inventory item from the process of retrieving an inventory item described in FIG. 9.

In referring to FIG. 9, the AGV 100 receives an instruction to retrieve an inventory item from a warehouse shelf. In some embodiments, the instruction may simply include the identification code of the inventory item and the AGV 100 looks up the position information of the item using the identification code. In some embodiments, the instruction may include the position of the inventory item and the AGV 100 can extract the position information of the item to be retrieved based on the instruction. In one embodiment, the position information includes the location of the inventory item, for example, x and y coordinates, or row and column number, etc., and the orientation of the inventory item, and the height, e.g., at which level of the shelf the item is stored. With the position information of the item, the AGV 100 navigates around the warehouse and approaches the location of the inventory item.

When the AGV 100 reaches the location (step 902), it turns on the primary lighting equipment 641 (step 904). The AGV 100 attempts to read the identification code on the inventory item (step 906). In some embodiments, the identification code may be a two-dimensional bar code. In other embodiments, the identification code can be any bar code. When the AGV 100 is not able to read the identification code, the AGV 100 sends a report to the server and aborts the task (step 950). When the AGV 100 is able to recognize the identification code, it calculates a position shift of the inventory item (step 908).

The AGV 100 is configured to report the position shift it obtains for the inventory item to a server (step 910). The server is configured to use the position shift and the layout of the warehouse to determine the correct location of the inventory item (step 912). The server then updates its database with the correct location of the inventory item (step 914).

Based on the position shift, the AGV 100 further determines whether the material handling device 130 can reach straight to the inventory item from where the AGV 100 stands (step 924). If no, the AGV 100 further adjusts or finetunes the position of the material handling device 130 (step 932) and then extends the material handling device 130 (step 934) while moving the AGV 100 to slightly adjust the position or orientation of the inventory item (step 936). If yes, the AGV 100 also checks whether the tray 633 is within the pre-determined range (step 922). If not, the AGV 100 slightly adjusts where the AGV stands (920) and attempts to read the identification code again (step 906). If yes, the tray 633 is within the pre-determined range, the AGV 100 adjusts the position of the material handling device 130 and rotates the tray 633 (step 926). before reading the identification code again to determine whether the position shift is within a threshold (step 928). If the shift is within the threshold, the AGV 100 extends the material handling device 130 to reach out to the inventory item (step 930). If the position shift is not reasonable or within a pre-determined threshold, the AGV 100 extends the material handling device (step 934) to adjust the position of the AGV 100 and the position of the inventory item (step 936).

In some embodiments, the AGV 100 is configured to find and retrieve an inventory item that is hidden behind an object or another inventory item. The AGV 100 may be configured to receive an instruction from a server indicating the position of a first inventory item to be fetched. The position includes the location, depth and orientation of the first inventory item. The AGV 100 is configured to fetch the first inventory item from the back row of the shelf if there is no inventory item in the front row. If there is a second inventory item in the front row, the AGV 100 is configured to fetch the second inventory item and place the second inventory item on a first tray on the multi-level frame 120 that is empty. The AGV 100 then fetches the first inventory item and places the first inventory item on a second tray on the multi-level frame 120 that is empty. Having retrieved the first inventory item, the AGV 100 returns the second inventory item where it is stored on the shelf.

In some embodiments, the shelves used in a warehouse may allow two or more rows of inventory items to be placed or stored inside the shelves. In such warehouse, the AGV 100 and the position information stored for each inventory item are modified or adapted to accommodate double-row deep shelves. In a method of controlling the AGV 100 to store or retrieve an inventory item placed on such shelf, the AGV 100 first receives an instruction to transport the first inventory item. The instruction may include the position of the first inventory item such as the location, the depth, and the orientation of the first inventory item. If the depth of the first inventory item indicates that the item is in the front row of the shelf, the AGV 100's fetching process is the same as previously described. If the depth of the first inventory item indicates that the item is in the back row of the shelf, the AGV 100's fetching process may require the AGV 100 to remove the inventory item in the front row in order to reach to the first inventory item in the back row. In some configurations, the AGV 100 is configured to take the second inventory item in the front row and place it on one of its empty trays, and then fetch the first inventory item from the back row and place it on another of its empty trays. After that, the robot returns the front row item to the front row. Indeed, if the AGV 100 is instructed to fetch both the first and second inventory items and they happen to be at the same location but in different rows, the AGV 100 doesn't need to return the second inventory item back to the shelf.

In some embodiments, the AGV 100 is configured to detect a position shift of either the first or second inventory item and adjust the stance and position of the AGV 100, and also the position of the inventory item before reaching into the shelf to fetch the inventory item, first or second. In one embodiment, the AGV 100 may repeat the position adjustment process until the detected position shift is smaller than a threshold. In one embodiment, the AGV 100 is configured to report the position shift to a server to allow the server to update a map of the warehouse. The map of the warehouse may illustrate the layout, i.e., where the shelves are and where the inventory items are stored.

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. An automated guided vehicle (AGV) designed for storing or retrieving inventory items, said AGV comprising:
   a drive unit configured to drive the AGV to travel between two warehouse shelves;
   a multi-level frame installed on the drive unit and comprising a lifting device and one or more plates configured to hold one or more inventory items;
   a material handling device, said material handling device comprising:
      a tray configured to hold an inventory item of the one or more inventory items;
      a lateral device configured to rotate the tray to the right side or the left side so that the tray is towards one of the two warehouse shelves; and
      a retractable device configured to extend or retract;
   a support frame, a camera set, a primary lighting device and two secondary lighting devices,
   wherein the camera set and to primary lighting device are installed at the front of the material handling device, and the two secondary lighting devices are installed at the support frame and located on either side of the camera respectively,
   wherein the retractable device comprises two arms installed on opposite sides of the tray, the two arms being extendable or retractable relative to the tray, and the two arms being configured to move the tray along a lateral direction to reach either one of the two warehouse shelves;
   wherein the lifting device is configured to move the material handling device in a vertical direction; and
   wherein the AGV is configured to transport the one or more inventory items.

2. The AGV of claim 1, wherein the multi-level frame comprises supporting columns to accommodate the lifting device.

3. The AGV of claim 2, wherein the lifting device is configured to move along the supporting columns and stop at each level of the multi-level frame.

4. The AGV of claim 3, wherein the lifting device is configured to lift the material handling device to a height along a vertical shaft to store or retrieve an inventory item at or from a warehouse shelf.

5. The AGV of claim 4, wherein the height is determined based on the position of the inventory item.

6. The AGV of claim 1, wherein the material handling device is configured to place an inventory item on one of the plates of the multi-level frame through retraction of the retractable device.

7. The AGV of claim 6. wherein the material handling device is further configured to place an inventory item onto a warehouse shelf through extension of the retractable device.

8. The AGV of claim 7, wherein the retractable device is configured to retract or extend to two or more positions, the two or more positions including a first and a second position.

9. The AGV of claim 1, further comprising:
   a transceiver configured to transmit and receive instructions to and from a warehouse server; and
   processors configured to interpret the instructions and to control the AGV.

10. The AGV of claim 9, wherein the transceiver is configured to receive an instruction to transport an inventory item and wherein the processors are configured to interpret the instruction to obtain a position of the inventory item.

11. The AGV of claim 10, wherein the position of the inventory item comprises an x-coordinate, a y-coordinate, an orientation of the AGV, and a height.

12. The AGV of claim 9, further comprising a navigation unit to detect obstacles and determine a moving path for the AGV based on the position of the inventory item.

13. The AGV of claim 12, wherein the navigation unit is configured to read navigation signs posted inside the warehouse for navigation purpose.

14. The AGV of claim 13, wherein the navigation signs include barcodes, two-dimensional barcodes, and other identification codes.

15. The AGV of claim 12, wherein, when the AGV is navigating toward the position of the inventory item, the processors are configured to command the material handling device to move to a height before the AGV reaches the position of the inventory item.

16. The AGV of claim 15, wherein the material handling device is configured to clamp the inventory item to move the inventory item onto or away from the tray.

17. The AGV of claim 15, wherein the tray of the material handling device is configured to slide underneath the inventory item and lift the inventory item.

18. The AGV of claim 9, further comprising a shift detection device, wherein the shift detection device is configured to detect a position shift of the inventory item compared to the position obtained from the instruction received by the AGV, and wherein, based on the position shift, the processors are configured to adjust the position of the AGV or the position of the material handling device to allow the material handling device to reach the inventory item for transportation.

19. The AGV of claim 18, wherein the shift detection device comprises one or more of a laser device, a radar device, a lighting device, a barcode reader, and a graph recognition device configured to detect the position shift.

20. The AGV of claim 1, wherein the drive unit comprises a motor and one or more drive wheels.

21. The AGV of claim 1, wherein the lateral device of the material handling device is configured to rotate the tray to either the right or left side by 90°.

22. An automated guided vehicle (AGV) system for storing or retrieving an inventory item in a warehouse, said system comprising:
   a drive unit configured to drive the AGV to travel in between two warehouse shelves;
   a multi-level frame installed on the drive unit and comprising a lifting device and one or more plates configured to hold one or more inventory items;
   a material handling device, said material handling device comprising;
      a tray configured to hold an inventory item;
      a lateral device configured to rotate the tray to the right side or the left side so that the tray is towards one of the two warehouse shelves; and
      a retractable device configured to extend or retract;
   a support frame, a camera set, a primary lighting device and two secondary lighting devices,
   a transceiver configured to communicate with a warehouse server; and
   one or more processors configured to control the AGV;
   wherein the AGV system is configured to navigate inside a warehouse between warehouse shelves and to reach inside warehouse shelves laterally; wherein the camera set and the primary lighting device are installed at the front of the material handling device, and the two secondary lighting devices are installed at the support frame and located on either side of the camera respectively: and wherein the retractable device comprises two arms installed on opposite sides of the tray, the two arms being extendable or retractable relative to the tray, and the two arms being configured to move the tray along a lateral direction to reach either one of the two warehouse shelves.

23. The AGV system of claim 22, wherein the lifting device is configured to move the material handling device vertically and to stop at each level of the multi-level frame or a height.

24. The AGV of claim 22, wherein the transceiver is configured to receive an instruction of transporting an inventory item and wherein the one or more processors are configured to obtain the position of the inventory item from the received instruction.

25. The AGV system of claim 22, further comprising a shift detection device configured to detect a position shift of the inventory item, wherein the one or more processors are configured to adjust, based on the position shift, the position of the AGV and the position of the lifting device to allow the lifting device to reach the inventory item for transportation.

26. The AGV system of claim 22, wherein the transceiver is further configured to receive an indication that a first inventory item is in a back row of a shelf, wherein the AGV is configured to fetch the first inventory item from the back row of the shelf if there is no inventory item in a front row, wherein if a second inventory item is in the front row, the AGV is configured to fetch the second inventory item and place the second inventory item on a first tray that is empty, fetch the first inventory item and place the first inventory item on a second tray that is empty, and return the second inventory item to the shelf.

27. The AGV system of claim 22, wherein the lateral device of the material handling device is configured to rotate the lifting device by 90° to the right side or left side.

* * * * *